Jan. 27, 1959    S. H. SÖDERSTRÖM    2,870,999
HEAT EXCHANGE ELEMENT
Filed Feb. 20, 1956
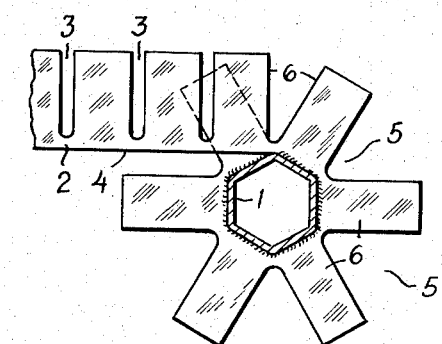
FIG.1
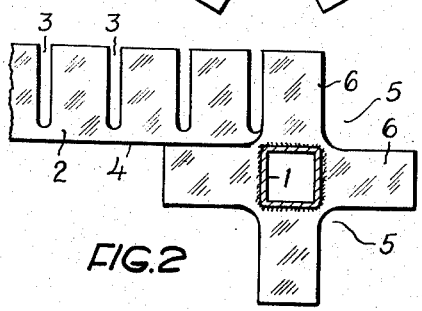
FIG.2
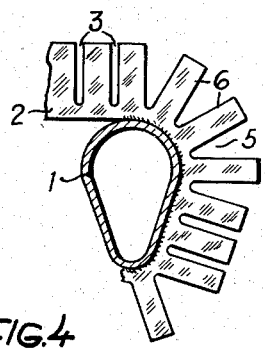
FIG.3
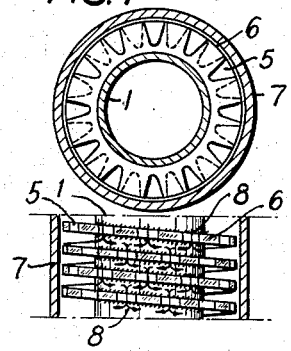
FIG.4
FIG.5
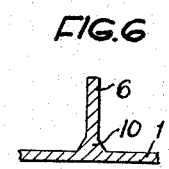
FIG.6
INVENTOR.
STEN HILDING SÖDERSTRÖM
BY
Young, Emery & Thompson
ATTYS.

United States Patent Office 2,870,999
Patented Jan. 27, 1959

2,870,999

HEAT EXCHANGE ELEMENT

Sten Hilding Söderström, Sollentuna, Sweden

Application February 20, 1956, Serial No. 566,593

Claims priority, application Sweden February 24, 1955

1 Claim. (Cl. 257—262.20)

The present invention relates to the manufacture of tubular heat exchanging elements with fins by winding a band about a tube with one longitudinal edge of the band bearing on the outside of the tube.

The invention also includes heat exchanging elements manufactured according to the method in view.

One object of the invention is to manufacture tubular heat exchanging elements by welding one edge of a transversely slitted band to form a perfect weld joint allowing maximum of heat transmission.

A further object of the invention is to weld a band to the outer side of a tube to form a heat exchanging element with fins which are resistive to corrosion and durable in use at a plurality of various heat exchanging media, such as oil and steam.

The article is provided with transverse slits in one edge of a band and is wound on a tube with the other longitudinal edge of the band in engagement with the tube, and to the latter edge of the tube is welded to form a continuous weld joint successively as the winding procedure proceeds.

The provision of transverse slits in the outer longitudinal edge of the band facilitates the accommodation of the band to the periphery of the tube so that the heat transferred to the band during the welding operation will be sufficient to engage the band with the tube during the winding operation.

Further features of the invention will appear from the following description of embodiments as illustrated in the accompanying drawings. Figs. 1, 2 and 3 show in cross section through different pipes the fin element during the winding operation in progress. Fig. 4 shows a cross section through a heat exchanging fin element inserted into a tube, and Fig. 5 shows the same fin element in elevation. Fig. 6 is an axial section of a portion of the tube wall having a fin welded thereto.

The tube 1, onto which the band 2 is wound, may be of an arbitrary suitable cross section and is shown in Fig. 1 as being of a hexagonal section. The band is provided, prior to or during winding, with edge recesses or slits 3 in the edge thereof that will be facing outwardly from the pipe. During the winding operation, which may be effected by mechanical means by the pipe being turned around about its longitudinal axis while being moved rectilinearly in the longitudinal direction or, alternatively, by a guiding means for the band being moved rectilinearly parallel to the tube, the band is preferably kept under tension by a tensile force (braking force) directed tangentially from the pipe, so that the inner edge 4 of the band will be set tightly against the circumference of the tube. In this way the band will lay itself helically along the tube while bearing closely on the peripheral portion thereof.

As the winding proceeds, the band is secured with its inner edge 4 to the tube. This is effected by a continuous weld joint, and to attain the best result it is of importance that the band and the weld joint are of the same material as that of the tube.

When the band forms itself to the circumference of the tube, the slits 3 open and form, broadly speaking, angular gaps 5 separated by cams or teeth 6.

In tubes having cross sections in the form of regular polygons, such as are shown in Figs. 1 and 2, it is suitable to arrange the distance between the slits 3 so that the cams of one turn on the pipe come opposite the cams of the remaining turns.

Fig. 2 shows the same construction as that shown in Fig. 1 but with tubes of a square cross section.

Fig. 3 shows the application of the invention to a tube having a pear-shaped cross section and obviously the same manner of manufacture may be applied in tubes of arbitrary cross sections.

In tubes with an arcuate peripheral portion, as in Fig. 3, and particularly with a peripheral portion on the lines of a circular arc, as in Figs. 4 and 5, the tooth gaps of one turn may be disposed opposite the teeth 6 of the next band convolution on the tube. This is attained by having the distance between the edge recesses of the band arranged to correspond with the magnitude of the circumference of the tube.

As will be seen from Fig. 5, the band extends helically along the tube, which might have been attained in the manner indicated. If desired, a plurality of bands may be wound at the same time, so that the element will present fins in the form of a number of threads.

The free distances between the band convolutions may vary but is for many practical needs preferably chosen to be 1–5 times the thickness of the band.

The thickness and the height of the cams 6 are adapted with respect to the heat transfer corresponding to the heat transfer numbers of the respective media.

The formation of the weld joint in such a manner as to obtain teeth or cams 6 with strong and enlarged base or root 10 is shown in Fig. 6 which also illustrates the manner in which the material of the tooth 6 and that of the tube wall form a continuous transition whereby an improved heat transfer is obtained.

Fig. 4 shows a portion of a finished element with tubes of a circular section inserted into an outer tube 7, which has a medium (liquid, steam, gas) flowing therethrough, to which heat is to be transferred from a medium (liquid, steam, gas) flowing in the tube 1. As shown by the arrows 8, the medium in the tube 7 flows in meandering paths due to the fact that the gaps 5 between the cams 6 are staggered relatively to one another in the various convolutions of the band. The continuous changes of direction of the medium will greatly improve the heat transfer thereof.

What I claim is:

A heat exchanging device, comprising in combination with a tube, a flat band of the same material as the tube having its inner longitudinal edge wound helically in direct contact with the surface of the tube and united with the tube by means of a continuous weld joint along said edge with same material as the band and tube, the outer longitudinal edge of the band being provided with transverse interspaced slits with the slits of one turn in axially staggered relation to the slits of the adjacent turn of the band; the spacing of the adjacent turns being in the ratio of 1 to 5 times the thickness of the band.

References Cited in the file of this patent

UNITED STATES PATENTS

| | | |
|---|---|---|
| 1,655,273 | Kelley | Jan. 3, 1928 |
| 1,689,568 | Wade | Oct. 30, 1928 |
| 1,909,704 | Morseth | May 16, 1933 |
| 1,932,610 | Tilley | Oct. 31, 1933 |
| 2,021,117 | Lucke | Nov. 12, 1935 |
| 2,418,619 | Brown | Apr. 8, 1947 |
| 2,473,634 | Brown | June 21, 1949 |